(12) United States Patent
Krause

(10) Patent No.: US 8,860,383 B2
(45) Date of Patent: Oct. 14, 2014

(54) CONTROL DEVICE AND METHOD FOR CONTROLLING A SEPARATELY EXCITED ROTOR WINDING OF A SYNCHRONOUS MACHINE

(75) Inventor: Axel Krause, Nesslau (CH)

(73) Assignee: BRUSA Elektronik AG, Sennwald (CH)

( * ) Notice: Subject to any disclaimer, the term of this patent is extended or adjusted under 35 U.S.C. 154(b) by 146 days.

(21) Appl. No.: 13/514,055

(22) PCT Filed: Jan. 13, 2011

(86) PCT No.: PCT/IB2011/050147
§ 371 (c)(1),
(2), (4) Date: Jul. 11, 2012

(87) PCT Pub. No.: WO2011/086513
PCT Pub. Date: Jul. 21, 2011

(65) Prior Publication Data
US 2012/0268082 A1    Oct. 25, 2012

Related U.S. Application Data

(60) Provisional application No. 61/295,161, filed on Jan. 14, 2010.

(30) Foreign Application Priority Data

Jan. 13, 2010  (CH) ..................................... 0038/10

(51) Int. Cl.
*H02P 9/30*    (2006.01)
*H02P 9/12*    (2006.01)
*H02P 9/14*    (2006.01)
*H02P 9/38*    (2006.01)

(52) U.S. Cl.
CPC .. *H02P 9/12* (2013.01); *H02P 9/30* (2013.01);
*H02P 9/302* (2013.01); *H02P 9/123* (2013.01);
*H02P 9/14* (2013.01); *H02P 9/38* (2013.01)
USPC .......................................................... 322/59

(58) Field of Classification Search
CPC ... H02P 2009/005; H02P 9/302; H02P 9/102;
H02P 9/48; H02P 9/305; H02P 9/007; H02P 2009/002
USPC .......................................................... 322/59
See application file for complete search history.

(56) References Cited

U.S. PATENT DOCUMENTS 3,984,755 A    10/1976  Lenhoff et al.
(Continued)

FOREIGN PATENT DOCUMENTS

AT    362456 B    5/1981
(Continued)

OTHER PUBLICATIONS

International Search Report and International Preliminary Report on Patentability, dated Jun. 9, 2011 from parent International Application PCT/IB2011/050147 published WO2011/086513A1 on Jul. 21, 2011; in English.
International Search Report (ISR) dated May 11, 2010 from priority Swiss national application CH0038/2010.

*Primary Examiner* — Tulsidas C Patel
*Assistant Examiner* — Sean Gugger
(74) *Attorney, Agent, or Firm* — George Kapsalas; Patentbuero Paul Rosenich AG

(57) ABSTRACT

A control device for a separately excited rotor winding ($L_R$) of a synchronous machine is described, which comprises a voltage source (2) connected to the rotor winding ($L_R$) and intended for transmitting electrical energy (E) from a power supply (4) to the rotor winding ($L_R$), in such a way that said rotor winding is caused to rotate by a rotating field on the stator side. According to the invention, the control device furthermore comprises a consumer (3) connected to the rotor winding ($L_R$) and intended for transmitting electrical energy (E) from the rotor winding ($L_R$) to the power supply (4). Furthermore, a method for controlling a separately excited rotor winding ($L_R$) of a synchronous machine is described.

18 Claims, 3 Drawing Sheets

(56) References Cited

U.S. PATENT DOCUMENTS

Figure 1:
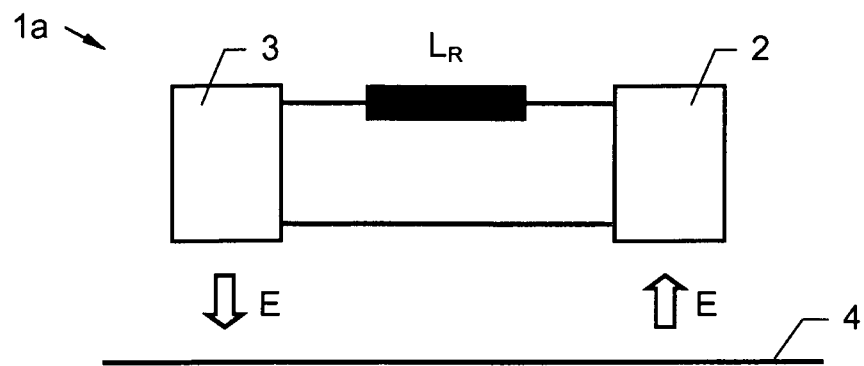

| | | | | |
|---|---|---|---|---|
| 4,106,069 | A * | 8/1978 | Trautner et al. | 361/30 |
| 4,152,636 | A * | 5/1979 | Gorden | 322/25 |
| 4,336,486 | A | 6/1982 | Gorden et al. | |
| 4,591,775 | A * | 5/1986 | Nussel et al. | 318/711 |
| 4,823,067 | A * | 4/1989 | Weber | 318/799 |
| 7,154,249 | B2 | 12/2006 | Velhner et al. | |
| 7,498,776 | B2 | 3/2009 | Nishimura | |
| 8,018,206 | B2 | 9/2011 | Weigel | |
| 2006/0181249 | A1 | 8/2006 | Velhner et al. | |
| 2008/0284386 | A1 | 11/2008 | Nishimura | |
| 2009/0153105 | A1* | 6/2009 | Czajkowski | 322/28 |
| 2009/0230927 | A1* | 9/2009 | Patterson | 322/12 |
| 2010/0134056 | A1* | 6/2010 | Yamamoto et al. | 318/400.15 |
| 2011/0121773 | A1 | 5/2011 | Schmidt et al. | |
| 2012/0007428 | A1* | 1/2012 | Rozman et al. | 307/66 |

FOREIGN PATENT DOCUMENTS

| | | |
|---|---|---|
| CA | 1106915 B | 8/1981 |
| DE | 1211319 B | 2/1966 |
| DE | 1638344 A1 | 9/1969 |
| DE | 1763299 A1 | 10/1971 |
| DE | 2127497 A1 | 12/1972 |
| DE | 2737541 A1 | 2/1978 |
| DE | 102005047551 A1 | 4/2007 |
| DE | 102008032210 A1 | 1/2010 |
| EP | 0152719 A1 | 8/1985 |
| EP | 0254129 A1 | 1/1988 |
| EP | 1926205 A1 | 5/2008 |
| JP | S58-036198 A | 3/1983 |
| WO | 93/20614 A1 | 10/1993 |

\* cited by examiner

CONTROL DEVICE AND METHOD FOR CONTROLLING A SEPARATELY EXCITED ROTOR WINDING OF A SYNCHRONOUS MACHINE

This application is a 35 U.S.C. 371 national-phase entry of PCT International application no. PCT/IB2011/050147 filed on Jan. 13, 2011 and also claims benefit of priority to Swiss national application no. CH-0038/2010 filed on Jan. 13, 2010, and also claims priority as a non-provisional of U.S. provisional application Ser. No. 61/295,161 filed on Jan. 14, 2010, and both Swiss national application no. CH-0038/2010 and U.S. provisional application Ser. No. 61/295,161 are incorporated herein by reference in their entireties for all intents and purposes, as if identically set forth in full herein.

The invention relates to a control device for a separately excited rotor winding of a synchronous machine, comprising a voltage source connected to the rotor winding for transmitting electrical energy from a power supply to the rotor winding, in such a way that this is caused to rotate by a rotating field on the stator side. Furthermore, the invention relates to a method for controlling a separately excited rotor winding of a synchronous machine, in which electrical energy from a power supply is fed to the rotor winding via a voltage source connected to said rotor winding, in such a way that it is caused to rotate by a rotating field on the stator side.

Synchronous machines have long been known and are used for a very wide range of purposes, both as a generator and as a motor. As brushless direct current motors, they have also captured large areas in direct current drive technology. An AC voltage for stator excitation is generated with the aid of an inverter from a DC voltage. The synchronous machines can furthermore be divided into permanently excited and separately excited synchronous machines. While the rotor comprises a permanent magnet in the first design, a rotor winding which builds up the corresponding rotor field as soon as current has flowed through the winding is provided in the case of the second design.

A popular embodiment of a separately excited synchronous machine consists of a rotor winding arranged on the rotor and a rectifier running together with the rotor. Said rectifier is supplied with AC voltage either via slip rings or via a rotary transformer and converts said AC voltage into a DC voltage required for the rotor winding. If the rotor winding is magnetized, the synchronous machine can in principle run in a rotating field applied on the stator side.

In addition to the known difficulties in starting up a synchronous machine, there is also the further problem of demagnetization of the rotor winding. For example, a synchronous generator is as a rule shut down so that the rotor winding is demagnetized. In the absence of a rotating field, no AC voltage is induced in the windings on the stator side. Particularly in the case of a fault, the rotor winding must be demagnetized as quickly as possible so that no more voltage is generated, which might cause damage. The prior art discloses some solutions for the demagnetization of the rotor winding.

For example, AT 362 456 B discloses a synchronous machine whose rotor can be demagnetized via a co-rotating resistor and a thyristor.

Furthermore, DE 1 638 344 A discloses a brushless synchronous machine whose rotor comprises two oppositely poled rotor windings which can be individually activated via two rotary transformers and two co-rotating rectifiers.

In addition, DE 2 737 541 A1 describes a brushless synchronous machine having a co-rotating controlled rectifier which, depending on operation, is made conductive in the positive or negative half-waves of the exciter voltage.

Finally, EP 0 152 719 A1 discloses a synchronous machine having a co-rotating rectifier, in which the current direction in the rotor winding can be reversed with the aid of two co-rotating thyristors actuated via slip rings.

Although the known solutions are suitable for certain applications or certain conditions, the fact that the demagnetization takes place neither exceptionally quickly nor efficiently according to the prior art is problematic. Particularly with the use of synchronous motors in electric vehicle construction, however, these limitations are often unacceptable.

It is therefore an object of the invention to provide an improved control device and an improved method for controlling a separately excited rotor winding of a synchronous machine, in particular with regard to quick and efficient demagnetization of the rotor winding.

According to the invention, this object is achieved by a control device of the type mentioned at the outset, which has a consumer connected to the rotor winding and intended for transmitting electrical energy from the rotor winding to the power supply.

According to the invention, this object is also achieved by a method of the type mentioned at the outset, in which electrical energy is withdrawn from the rotor winding via a consumer connected to it and is transmitted to the power supply.

By means of the invention, several disadvantages of the prior art are simultaneously overcome. Firstly, the rotor winding can be very quickly demagnetized; secondly, this can be effected very efficiently. This is possible because the energy stored in the rotor winding is not converted into heat as usual but transferred back into the power supply. For this reason, it is also not necessary to provide a large-dimensioned resistor which can handle the necessary thermal power. This means that, in designing a synchronous machine, the engineer is no longer faced with the conflicting choice between bulky load resistor/quick demagnetization and small load resistor/slow magnetization. In addition, no energy is "destroyed" in the form of heat.

The advantage of the invention—although this can of course also be used in other areas—is evident in particular when a synchronous machine is used for an electric vehicle. Since electric vehicles are as a rule intended for transporting people, it is necessary to take particular safety precautions here in order to avoid endangering the health of the passengers.

For example, a converter for supplying the stator windings might be faulty and it might not be possible to switch it off. This would mean that the wheels would still be driven in an undesired manner until demagnetization of the rotor. Moreover, a short-circuit between the stator windings could lead to blocking of the rotor and hence of the drive wheels of the vehicle unless the rotor is demagnetized as quickly as possible. The fast demagnetization can therefore also be regarded as equivalent to the actuation of a (mechanical) clutch in a vehicle having an internal combustion engine. Advantageously, this component can now be omitted and can be replaced by an electronic circuit which as a rule is smaller, lighter, more reliable and also cheaper than a mechanical clutch. Moreover, the possibility of quick demagnetization of the rotor also improves the reaction (acceleration/deceleration) of the vehicle to the driver's requirements (accelerator).

In addition to the quick demagnetization of the rotor winding for increasing the safety, energy aspects do of course play a decisive role. Particularly in the case of electric vehicles, the stored electrical energy which in any case is in short supply should be managed carefully. While in known solutions the magnetic energy stored in the rotor is converted into heat on deexcitation, as mentioned, generally via a load resistor, and is therefore dissipated without use, the magnetic energy stored in the rotor is, according to the invention, fed back into the on-board supply of the electric vehicle (as a rule a DC voltage supply having a voltage of a few hundred volt). The energy is therefore not lost but can be used for the next magnetization process. Owing to the energy-efficient demagnetization, the invention has a considerable advantage over solutions known from the prior art. The "clutch" of a vehicle is in fact operated very frequently, particularly in the city, for example in order to allow the vehicle to roll up to a red traffic light in order to use the kinetic energy in the vehicle (unless it is in any case fed back into the battery via the drive).

Finally, it should also be noted that the terms "voltage source" and "consumer" relate to the "perspective" of the rotor winding. In electrical energy, an energy source is characterized in such a way that current and voltage are differently directed; in a consumer, the direction is the same. In the case of magnetization, the rotor winding is a consumer and is therefore supplied with energy from a voltage source or energy source. In the case of demagnetization, the rotor winding is an energy source from which energy is withdrawn via a consumer. From the point of view of the supply, however, the voltage source coordinated with the rotor winding acts as a consumer and the consumer coordinated with the rotor winding acts as a voltage source. Strictly speaking, the voltage source coordinated with the rotor winding and the consumer coordinated with the rotor winding are therefore "converters".

Advantageous configurations and further developments of the invention are evident or disclosed from the entirety of this disclosure including the description when considered together with the figures of the drawings.

It is advantageous if the energy fed to and/or removed from the rotor winding is adjustable. In this way, the dynamic process of magnetization or demagnetization can take place in a very differentiated manner. This means that the synchronous machine can be influenced in a very sensitive manner.

It is furthermore advantageous if the control device is set up for supplying the rotor winding for magnetization with more power via the voltage source than is removed via the consumer and for removing less power from the rotor winding for demagnetization via the voltage source than is removed via the consumer. Voltage source and consumer can be operated not only alternately but also simultaneously. By appropriate adjustment of the power supplied or removed, the rotor winding can be magnetized or demagnetized.

It is furthermore advantageous if the voltage source comprises a step-down converter or step-up converter connected to a power supply and/or the consumer comprises a step-down converter or step-up converter connected to the power supply. In this way, the voltage required in the rotor circuit can easily be adapted to the voltage present in the power supply.

It is particularly advantageous if the voltage supply comprises a stationary first inverter, a primary winding with first rotary transformer, which primary winding is connected to said inverter, and a first rectifier connected to a secondary winding of the first rotary transformer and co-rotating with the rotor winding. In this way, the energy can be transmitted without contact from the stator to the rotor. The control device thus obtained and the system thus obtained are therefore particularly hard-wearing and not very susceptible to faults.

A "rotary transformer" is in general a transformer in which the primary winding(s) and secondary winding(s) are mounted so as to be rotatable relative to one another. A rotary transformer or "rotary transmitter" serves, inter alia, for transmitting electrical energy or electrical signals from a stationary part to a rotating part, or vice versa. Since the rotary transformer also functions in principle with single-phase AC voltage, it should be distinguished from the "three-phase transformer", which as a rule has no rotatably mounted primary winding(s) or secondary winding(s).

It is furthermore particularly advantageous if the consumer comprises a second inverter connected to the rotor winding and co-rotating with it, a primary winding of a secondary rotary transformer, which primary winding is connected to the second inverter, and a stationary, second rectifier connected to a secondary winding of the second rotary transformer. In this way, the energy can be transmitted without contact from the rotor to the stator. The control device thus obtained and the system thus obtained are therefore likewise particularly hard-wearing and not very susceptible to faults.

It is particularly advantageous if the control device comprises a varistor connected parallel to the rotor winding. This provides an alternative possibility for demagnetizing the rotor winding even without the consumer connected to the power supply.

In this context, it is particularly advantageous if the control device is set up to shut down both inverters for demagnetization of the rotor winding. This makes it possible to realize an "emergency demagnetization" in which the demagnetization is effected by the abovementioned varistor. Of course, this possibility exists not only for an intentional shut down of the inverters but also when the inverters accidentally fail. This variant of the circuit according to the invention is therefore particularly safe.

It is also particularly advantageous if the control device comprises a means for transformational transmission of control signals to the first and/or second inverter. This is a further measure for making the control device according to the invention or the system according to the invention hard-wearing and not very susceptible to faults.

In this context, it is particularly advantageous if the first rotary transformer comprises one or more secondary coils at which the control signals for the second inverter are tapped. In this way, the output voltage of the first inverter can be used directly for actuating the second inverter in that it is transmitted via a plurality of secondary coils of the first rotary transformer to the control connections of the second inverter, i.e. in most cases to the gate connections of the transistors of the inverter.

Finally, it is advantageous if the control device comprises connections for a single rotor winding. In this way, both the control device and the synchronous machine can be kept simple. The components thus obtained are firstly light and secondly, owing to the reduced complexity, also fail-safe. They are therefore particularly suitable for installation in an electric vehicle.

The above configurations and further developments of the invention can be combined in any desired manner.

The present invention is explained in more detail below with reference to the working examples shown in the schematic figures of the drawing.

Figure 2:
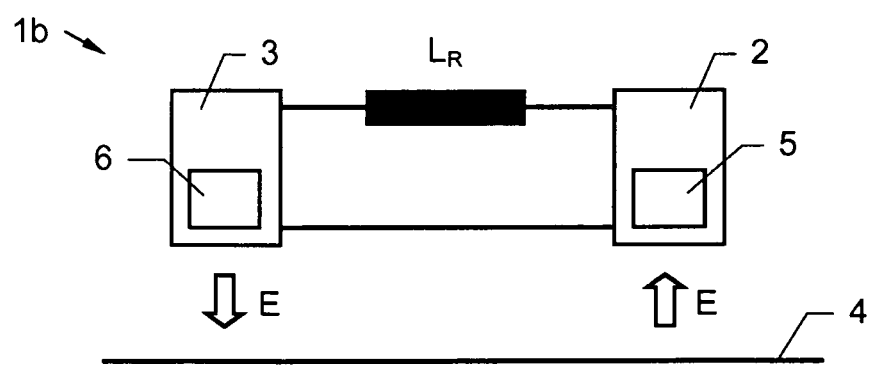
Figure 3:
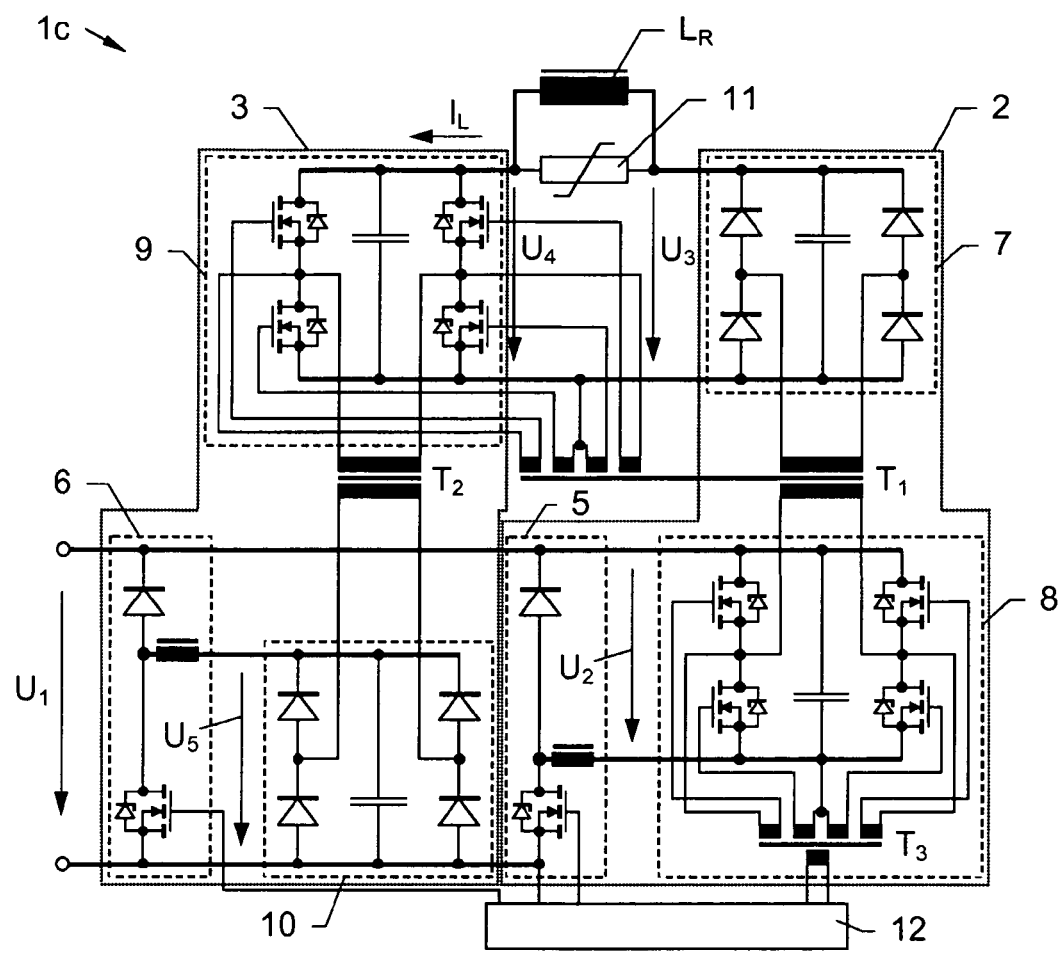
Figure 4:
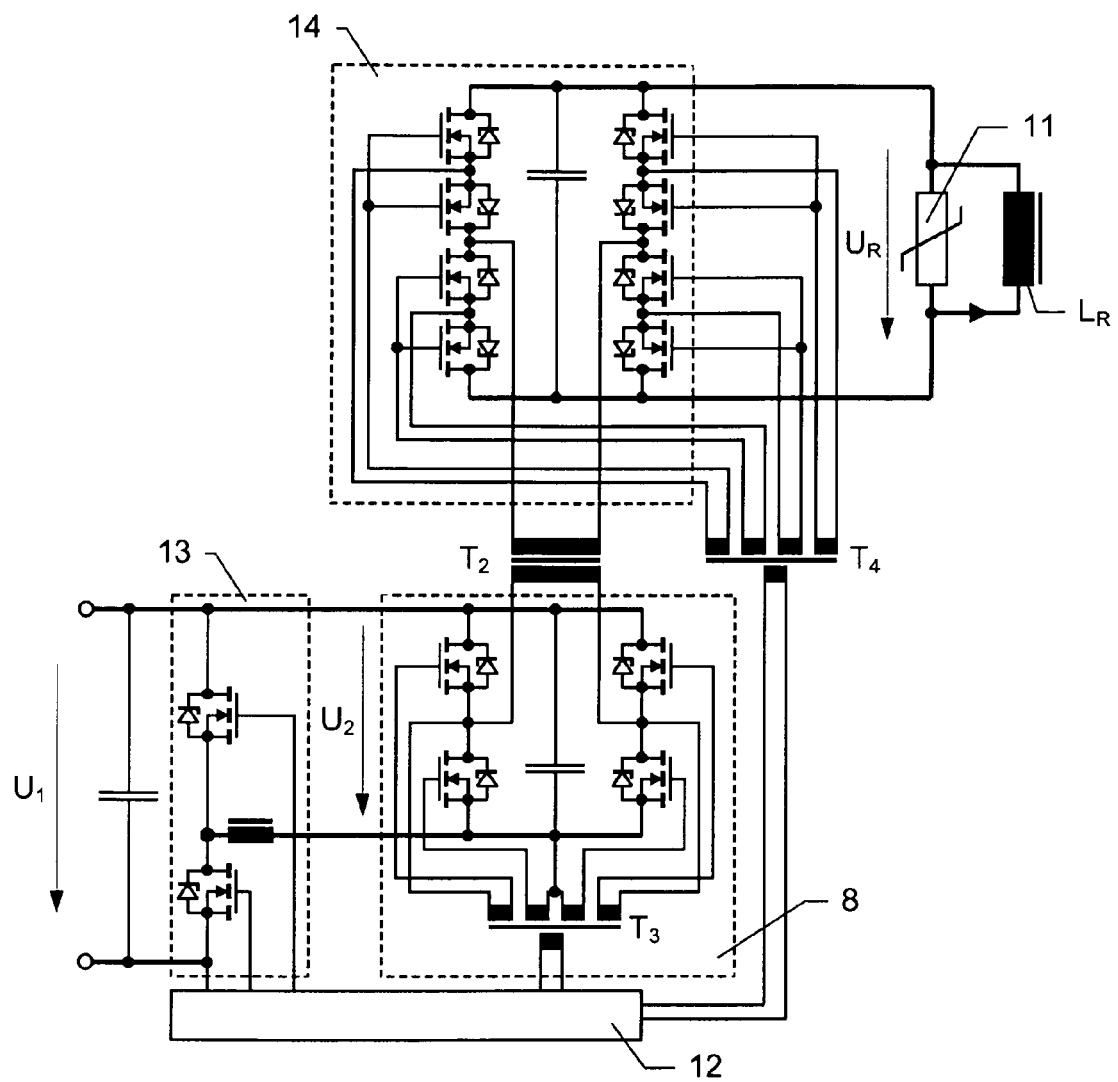

FIG. 1 schematically shows a first variant of a system according to the invention;

FIG. 2 schematically shows a second variant of a system according to the invention comprising additional step-up and step-down converters;

FIG. 3 shows a third, detailed embodiment of the system according to the invention and FIG. 4 shows a fourth, detailed embodiment of the system according to the invention.

In the figures of the drawing, identical and similar parts are provided with identical reference numerals and functionally similar elements and features—unless stated otherwise—are provided with identical reference numerals but different indices.

FIG. 1 shows a first variant of a system 1a according to the invention, consisting of a control device and a synchronous machine connected thereto. The diagram is greatly simplified, and it is for this reason that only one separately excited rotor winding $L_R$ of the synchronous machine is shown. A voltage source 2 for transmitting electrical energy E from a power supply 4 to the rotor winding $L_R$ is connected as part of the control device to said rotor winding. According to the invention, the control device also comprises a consumer 3 connected to the rotor winding $L_R$ and intended for transmitting electrical energy E from the rotor winding $L_R$ to the power supply 4.

The function of the arrangement shown in FIG. 1 is as follows:

If electrical energy E is fed from the supply 4 to the rotor winding $L_R$ via the voltage source 2, the rotor winding $L_R$ is excited or magnetized, and a rotating field generated in the stator winding (not shown) causes the rotor winding $L_R$ and hence the rotor to rotate in a manner known per se. For deexcitation or demagnetization, electrical energy E can now be withdrawn from the stator winding $L_R$ with the aid of the consumer 3 and fed back into the power supply 4. A rotating field in the stator windings then no longer leads to rotation of the rotor winding $L_R$.

Depending on the design of the consumer 3, this process can occasionally be carried out very rapidly, which is advantageous particularly with the use of such a synchronous machine in an electric vehicle. As already mentioned, a converter for the supply of the stator windings may, for example, be faulty and might not allow itself to be switched off. Alternatively, a short-circuit between the stator windings might lead to blocking of the rotor and hence of the drive wheels of the vehicle. In addition to the quick demagnetization of the rotor winding $L_R$ for increasing the safety, energy aspects can of course, as already mentioned, also play a decisive role. Particularly in the case of electric vehicles, the stored electrical energy which in any case is in short supply should indeed be carefully managed.

Of course, the invention can also be used for other purposes, for example for stationary synchronous machines.

For different possibilities for influencing the rotor field, it is also advantageous if the energy E fed to and/or removed from the rotor winding $L_R$ is adjustable. As a result, the interplay of rotor field and stator field can be very sensitively influenced. Of course, the voltage source 2 and the consumer 3 not only can be connected alternately but they can also be in operation simultaneously. For magnetization, more power should be supplied to the rotor winding $L_R$ via the voltage source 2 than is removed via the consumer 3 and, for demagnetization, less power should be fed to it via the voltage source 2 than is removed via the consumer 3.

FIG. 2 shows a second variant of a system 1b according to the invention which is very similar to the system 1a shown in FIG. 1. The system 1a is extended in such a way that the voltage source 2 comprises a step-down converter 5 connected to the power supply 4 and the consumer 3 comprises a step-up converter 6 connected to the power supply 4. In this way, a potential difference between voltage source 2, consumer 3 and the power supply 4 can be very easily established in order to bring about a desired energy flow E.

FIG. 3 shows a third, somewhat more detailed variant of a system 1c according to the invention. In FIG. 3, the rotor of the synchronous machine is shown in the upper region and the stator in the lower region. The separating line between rotor and stator is formed by the two rotary transformers $T_1$ and $T_2$.

The system 1c comprises a connection to a power supply (not shown in FIG. 3), via which the system 1c is supplied with a DC voltage $U_1$. For the following explanation, it is assumed for the sake of simplicity that the voltage $U_1$ is rigid. In real systems, this precondition is not completely fulfilled. The voltage variations should then be taken into account accordingly. The rotor winding $L_R$ is once again connected via a voltage source 2 and a consumer 3 to the power supply.

The voltage source 2 comprises a step-down converter 5, a stationary first inverter 8 connected to the step-down converter 5, a primary winding of a first rotary transformer $T_1$, which primary winding is connected to said inverter, and a first rectifier 7 connected to a secondary winding of the first rotary transformer $T_1$ and co-rotating with the rotor winding $L_R$.

The consumer 3 comprises a second inverter 9 connected to the rotor winding $L_R$ and co-rotating with it, a primary winding of a second rotary transformer $T_2$, which primary winding is connected to the second inverter 9, and a stationary, second rectifier 10 connected to a secondary winding of the second rotary transformer $T_2$, and a step-up converter 6 connected to the rectifier 10.

In addition, a varistor 11 is connected parallel to the rotor winding $L_R$. Furthermore, the control device comprises a monitoring unit 12 which is connected to the step-down converter 5, the step-up converter 6 and the first inverter 8.

Finally, the control device comprises a means for transformational transmission of control signals to the first and/or second inverter 8, 9. These are formed firstly by the third transformer $T_3$, via whose four secondary coils the transistors of the first inverter 8 are actuated, and secondly by the four additional secondary coils on the first rotary transformer $T_1$, at which the control signals for the second inverter 9 are tapped.

Although the transmission of electrical energy E and of electric signals between stator and rotor takes place in the present example exclusively inductively, embodiments in which the transmission takes place, for example, via slip rings are of course also conceivable. For example, radio or optical data transmission is in principle also possible for the signal transmission.

The function of the arrangement shown in FIG. 3 is as follows:

Via the step-down converter 5, the input voltage $U_1$ is transformed into an arbitrary lower voltage $U_2$. This voltage $U_2$ is converted via the first inverter 8 into an AC voltage, transmitted via the first rotary transformer $T_1$ to the rotor and transformed there with the aid of the first rectifier 7 into a DC voltage $U_3$.

The second inverter 9 is also actuated synchronously with the first inverter 8, which inverter 9 converts the DC voltage $U_4$ into an AC voltage, which is transmitted via the second rotary transformer $T_2$ from the rotor to the stator and is converted there with the aid of the second rectifier 10 back into a DC voltage $U_5$. This DC voltage $U_5$ is stepped up via the step-up converter 6 to the voltage $U_1$.

By appropriate actuation of the step-down converter 5, any desired voltage $U_3$ can be set. Analogously, by appropriate actuation of the step-up converter 6, any desired voltage $U_4$ can be set. Consequently, any desired voltage can also be set at the rotor winding $L_R$. If the voltage $U_3$ is greater than the voltage $U_4$, the current $I_L$ is increased by the rotor winding $L_R$; if the voltage $U_3$ is less than the voltage $U_4$, the current $I_L$ is reduced.

Of course, the voltage ratios are also determined by the duty cycle of the two inverters 8 and 9 and by the transformation ratio of the two rotary transformers $T_1$ and $T_2$. With appropriate design, it may optionally also be appropriate to provide a step-up converter instead of the step-down converter 5 and/or a step-down converter instead of the step-up converter 6. By providing corresponding voltage potentials, the transfer of energy E from the power supply into the rotor winding $L_R$, or vice versa, can in any case be effected.

The step-down converter 5, the step-up converter 6 and the first inverter 8 are now controlled by the monitoring unit 12 in such a way that a required current $I_L$ through the rotor winding $L_R$ results. It is possible to distinguish between different operational cases, a transformation ratio of 1 being assumed for the two rotary transformers $T_1$ and $T_2$ in this example:

Base load: e.g. $U_2=U_3=150V$, $U_4=U_5=100V$; the voltage at the rotor winding $L_R$ is $U_3-U_4=50V$ Increased load: e.g. $U_2=U_3=300V$, $U_4=U_5=0V$; the voltage at the rotor winding $L_R$ is $U_3-U_4=300V$ Controlled demagnetization: e.g. $U_2=U_{3=150}V$, International Search Report (ISR) dated May 11, 2010 from priority Swiss national application CH0038/2010. $U_4=U_{5=450}V$; the voltage at the rotor winding $L_R$ is $U_3-U_4=300V$, and the rotor current $I_L$ decreases rapidly Emergency demagnetization: The first inverter 8 is switched off. As a result, the second inverter 9, too, becomes inactive, and all transistors (in this case MOFETs) are switched off. The voltage at the rotor winding $L_R$ is limited by the varistor 11, e.g. to −1000V. The energy present in the rotor winding is converted in the varistor 11 into heat.

Since two transistors which in the present example each have a reverse voltage of 600V are present in series on the inverter, these are not overloaded. In the example shown, it is furthermore assumed that a gate voltage of about 6V is sufficient for interconnecting the rotor MOSFETs, and a maximum value of 20V is permissible. In this example, the voltage $U_2$ or $U_3$ may therefore vary in the ratio of about 1:3. If it is intended to circumvent this limitation, the gate voltage can also be limited by a suitable measure or the gate actuation effected via a separate third rotary transformer.

Finally, a fourth variant of the invention is discussed. It is possible in principle to make do with only one rotary transformer, but then either bipolar switches in the secondary power circuit (inverter) or a polarity inverter between inverter and rotor winding is then required. In this case, at least one further transformer for the control signals is advantageous.

FIG. 4 shows such an arrangement, in which the converters of the arrangement are designed to enable a bidirectional flow of energy. For this reason, the following sub-circuits are combined each to a single circuit, which performs the functionality of the according sub-circuits.

The function of the step-down converter 5 and the step-up converter 6 is performed by a half bridge 13 constructed of two MOSFETs with antiparallel diodes.

The function of the first inverter 8 and the second rectifier 10 is performed by the first inverter 8 constructed of two MOSFETs with antiparallel diodes.

The function of the first rectifier 7 and the second inverter 9 is performed by a full bridge 14 each consisting of two antiserial MOSFETs with antiparallel diodes. The polarity of voltage $U_R$ at the varistor 11 is defined by the phase of the control signals at the third transformer $T_3$ of the first inverter 8 and at the fourth rotary transformer $T_4$. If both signals are in phase, then the voltage $U_R$ is positive. If the signals are opposite in phase, then the voltage $U_R$ is negative. It should be noted at this point that, for the half bridge 13, the first inverter 8 and the full bridge 14, IGBTs may be applied instead of or as well as MOSFETs. Furthermore, it should be noted that MOSFETs comprise internal antiparallel diodes anyway so that external antiparallel diodes may be omitted. However, as IGBTs do not comprise internal antiparallel diodes external diodes are needed in this case.

Finally, it is noted that the variants described represent only a selection from the many possibilities for a control device according to the invention and must not be used for limiting the scope of application of the invention. It should be easy for the person skilled in the art to adapt the invention to its needs on the basis of the considerations described here, without departing from the scope of claimed protection of the invention. In addition, it is pointed out that parts of the apparatuses shown in the figures can also form the basis for independent inventions.

LIST OF REFERENCE LABELS

1a . . . 1c System consisting of a control device and rotor winding
2 Voltage source
3 Consumer
4 Power supply
5 Step-down converter
6 Step-up converter
7 First rectifier
8 First inverter
9 Second inverter
10 Second rectifier
11 Varistor
12 Monitoring unit
13 half bridge
14 full bridge
E Energy
$L_R$ Rotor winding
$I_L$ Current through rotor winding
$U_1$ Supply voltage
$U_2$ Voltage at the first inverter
$U_3$ Voltage at the first rectifier
$U_4$ Voltage at the second inverter
$U_5$ Voltage at the second rectifier
$U_R$ Voltage at the varistor
$T_1$ First rotary transformer
$T_2$ Secondary rotary transformer
$T_3$ Third transformer
$T_4$ Fourth (rotary) transformer

What is claimed is:

1. A control device for a separately excited rotor winding, comprising:
a voltage source, said voltage source electrically connected to a first side of a rotor winding;
said voltage source transmitting electrical energy from a power supply to said rotor winding;
a consumer circuit electrically connected to a second side of said rotor winding to transmit electrical energy from said rotor winding to said power supply;
a stationary first inverter in said voltage source;
a first rotary transformer primary winding connected to said stationary first inverter; and,
a first rotary transformer secondary winding, said first rotary transformer secondary winding being electrically connected to a first rectifier, and said first rotary transformer secondary winding coupled to co-rotate with said rotor winding.

2. The control device for a separately excited rotor winding as claimed in claim 1, wherein:
said voltage source is configured to controllably adjust electrical energy supplied to said rotor winding.

3. The control device for a separately excited rotor winding as claimed in claim 1, wherein:
said consumer circuit is configured to controllably adjust electrical energy removed from said rotor winding.

4. A control device for a separately excited rotor winding as claimed in claim 1, further comprising:
a step-down converter in said voltage source, said step-down converter being electrically connected to said power supply.

5. A control device for a separately excited rotor winding as claimed in claim 1, further comprising:
a step-up converter in said voltage source, said step-up converter being electrically connected to said power supply.

6. A control device for a separately excited rotor winding as claimed in claim 1, further comprising:
a step-down converter in said consumer circuit, said step-down converter being electrically connected to said power supply.

7. A control device for a separately excited rotor winding as claimed in claim 1, further comprising:
a step-up converter in said consumer circuit, said step-up converter being electrically connected to said power supply.

8. A control device for a separately excited rotor winding as claimed in claim 1, further comprising:
a varistor electrically connected parallel to said rotor winding.

9. A control device for a separately excited rotor winding as claimed in claim 1, further comprising:
a second inverter electrically connected to said rotor winding and coupled to co-rotate with said winding;
a second rotary transformer primary winding, said second rotary transformer primary winding being electrically connected to said second inverter; and,
a stationary second rectifier, said second rectifier being electrically connected to a second rotary transformer secondary winding.

10. A control device for a separately excited rotor winding as claimed in claim 9, further comprising:
a control signal transmitter configured to convey control signals to said first inverter.

11. A control device for a separately excited rotor winding as claimed in claim 10, further comprising:
a second control signal transmitter configured to convey control signals to said second inverter.

12. A control device for a separately excited rotor winding as claimed in claim 11, further comprising:
said first rotary transformer primary winding and said first rotary transformer secondary winding forming a first rotary transformer; and,
a secondary coil configured to tap control signals for said second inverter from said first rotary transformer.

13. A control device for a separately excited rotor winding as claimed in claim 10, further comprising:
a monitoring unit configured to control said first inverter, said monitoring unit being connected to said control signal transmitter.

14. A method for controlling a separately excited rotor winding, comprising:
supplying electrical energy from a power supply;
receiving at a voltage source the electrical energy from the power supply;
supplying the electrical energy received at the voltage source to the rotor winding;
rotating the rotor winding by action of a stator-side rotating magnetic field;
withdrawing electrical energy from the rotor winding with a consumer circuit;
transmitting the electrical energy withdrawn from the rotor winding back into the power supply; and,
supplying, in magnetizing, more power to the rotor winding via the voltage source, relative to simultaneously removing less power from the rotor winding via the consumer circuit.

15. A method for controlling a separately excited rotor winding as claimed in claim 14, further comprising:
removing, for demagnetization, less power from the rotor winding via the voltage source, relative to simultaneously removing more power from the rotor winding via the consumer circuit.

16. A method for controlling a separately excited rotor winding as claimed in claim 14, further comprising:
shutting down inverters, in the voltage source and in the consumer circuit, for demagnetizing the rotor winding.

17. A control device for a separately excited rotor winding, comprising:
a voltage source, said voltage source electrically connected to a first side of a rotor winding, said voltage source configured to controllably adjust electrical energy supplied to said rotor winding;
said voltage source transmitting electrical energy from a power supply to said rotor winding;
said voltage source including a step-down converter electrically connected to said power supply, said voltage source including a stationary first inverter, said voltage source including a first rotary transformer primary winding connected to said stationary first inverter, said voltage source including a first rotary transformer secondary winding, said first rotary transformer secondary winding being electrically connected to a first rectifier, and said first rotary transformer secondary winding coupled to co-rotate with said rotor winding;
a consumer circuit electrically connected to a second side of said rotor winding to transmit electrical energy from said rotor winding to said power supply, said consumer circuit being configured to controllably adjust electrical energy removed from said rotor winding;
said consumer circuit including a step-up converter electrically connected to said power supply, said consumer circuit including a second inverter electrically connected to said rotor winding and coupled to co-rotate with said winding, said consumer circuit including a second rotary transformer primary winding, said second rotary transformer primary winding being electrically connected to said second inverter, said consumer circuit including a stationary second rectifier, said second rectifier being electrically connected to a second rotary transformer secondary winding;
said first rotary transformer primary winding and said first rotary transformer secondary winding forming a first rotary transformer; and,
a varistor electrically connected parallel to said rotor winding.

18. A control device for a separately excited rotor winding as claimed in claim 17, further comprising:
a secondary coil configured to tap control signals for said second inverter from said first rotary transformer.

* * * * *